United States Patent [19]

Von Wattenwyl

[11] 4,268,265

[45] May 19, 1981

[54] NATURAL DYESTUFFS FOR GELATINE CAPSULES

[75] Inventor: Andre R. Von Wattenwyl, Reinach, Switzerland

[73] Assignee: Parke, Davis & Company, Morris Plains, N.J.

[21] Appl. No.: 57,485

[22] Filed: Jul. 13, 1979

[30] Foreign Application Priority Data

Jul. 24, 1978 [CH] Switzerland ............... 7976/78

[51] Int. Cl.³ .............................................. C09B 61/00
[52] U.S. Cl. ............................................ 8/438; 8/440; 8/517; 8/646; 260/117
[58] Field of Search .................. 8/53, 80, 81, 91, 93, 8/438, 440, 517, 646

[56] References Cited

U.S. PATENT DOCUMENTS

| 1,303,426 | 5/1919 | Wall | 8/81 |
| 1,337,673 | 4/1920 | Wall | 8/81 |
| 4,082,660 | 4/1978 | Papirer et al. | 210/36 |

FOREIGN PATENT DOCUMENTS 715809  5/1968  Belgium .
2802789  7/1978  Fed. Rep. of Germany .
1291155  4/1962  France .
2299385  10/1976  France .

Primary Examiner—A. Lionel Clingman
Attorney, Agent, or Firm—Louis S. Gillow

[57] ABSTRACT

Process for stabilizing dyestuffs sensitive to light and/or oxidation, especially natural dyestuffs, by adsorption on a highly disperse adsorbent, whereby the dyestuff is immobilized, as well as the application of the process to dyestuffs which are determined for dyeing medicines, for instance gelatine capsules for medicinal purposes, cosmetics, food stuffs and animal feed.

8 Claims, No Drawings

NATURAL DYESTUFFS FOR GELATINE CAPSULES

The invention relates to a process for stabilizing dyestuffs sensitive to light and oxidation, especially natural dyestuffs, and the preferred application of this process to those dyestuffs useful for dyeing medicines, cosmetics, food stuffs or animal feed.

It is known that numerous dyestuffs of natural or synthetic origin used for dyeing medicines, cosmetics, food stuffs or animal feed are extremely sensitive to light and/or oxidation and are easily modified or degraded under environmental influences. This is the case when using natural dyestuffs which are especially unstable to environmental influences such as oxygen, light and moisture.

The object of the invention is, therefore, to provide a process which allows the conversion of the dyestuffs to be used into more stable products insensitive to influences of the environment without loosing their dye properties and/or their physiological compatability. Said problem can be solved by the process according to the invention which is characterized in that the dyestuffs are dissolved in a solvent, and the solution is brought into contact with a finely divided adsorbent in order to immobilize the dyestuff by adsorption.

When applying said process for the stabilization of dyestuffs, useful for dyeing medicines, cosmetics, food stuffs or animal feed especially of natural origin the dyestuffs are dissolved in a physiologically compatible and/or readily volatile solvent, and the solution is brought into contact with a finely divided physiologically compatible adsorbent in order to immobilize the dyestuff by adsorption.

Especially finely divided inorganic materials, such as carbonates, silicates, hydroxides or oxides of elements of the II., III. or IV. group of the periodic system of the elements can be used as adsorbents. Besides these inorganic adsorbents, finely divided organic materials, especially cellulose, starches, alginates as well as physiologically compatible polyamides or polyacrylates in the form of a powder can be used. The particle size of the materials used as adsorbents is generally 1 to 100 $\mu$m, preferably 5 to 40 $\mu$m.

Suitable solvents for preparing the dyestuff solutions are besides water also organic solvents, such as alcohols, for instance ethanol or propanol, or diethylester, tetrachloro ethylene and acetone. When organic solvents are used in the process of stabilizing dyestuffs for dyeing medicines, cosmetics, food stuffs, and animal feed, it is necessary that said solvents are readily volatile and vaporize without any residue at the temperatures applied.

The adsorption is suitably performed at room temperature or slightly elevated temperature and at a pH value of 3 to 10, preferably of 5 to 7.5. The pH value to be adjusted in the individual case depends on the particular combination of adsorbent and adsorbate used.

The concentration of the dyestuff solution is about 0.1 to 10% by weight, the concentration of the adsorbent is about 1 to 10% by weight, based on the weight of the solvent. The duration of action of the dyestuff solution on the adsorbent depends on the affinity of the dyestuff to the adsorbent and is more or less strong depending on the adsorption capacity of the substrate used as adsorbent. Generally, the time of action is adjusted in such a manner that a bath exhaustion of at least 50% is obtained, i.e. that at least 50% of the dyestuff contained in the solution is adsorbed on the adsorbent.

In order to attain an increased adsorption so-called adsorption promoters can be added. Said promoters are generally inorganic compounds with small molecular size, preferably halides, sulfates and phosphates of alkali metals by which a salt of the dyestuff is formed. These compounds are used in amounts of 1 to 10, preferably 5 to 10% by weight, based on the weight of the adsorbent.

The adsorption of the dyestuffs on the adsorbent can take place depending on the solubility of the dyestuff concerned in ionic or non-ionic form. It has, however, to be emphasized that the adsorption in the present case is an exclusively physical action by which no chemical modification of the dyestuffs takes place. It is supposed that the stabilizing effect of the adsorption is due to the reduction of the entropy of the dyestuff caused by immobilization of the dyestuff on the adsorbent which results in a lower reactivity of the dyestuff.

Further improvement of the oxidation resistance can be achieved by addition of antioxidants. Addition of antioxidants oxidants is especially advisable in the case of dyestuffs which are extremely sensitive to oxidation. Suitable antioxidants are for example tocopherol, 6-ethoxy-1,2-dihydro-2,2,4-trimethylquinoline (ethoxyquin) and ascorbyl palmitate. The antioxidants are generally used in concentrations of 0.1 to 10% preferably 0.1 to 2% by weight, based on the weight of the dyestuff.

When the adsorption is completed the dyestuffs so obtained can be isolated from the solution in usual manner. Usually the adsorbent charged with the adsorbed dyestuff is seperated from the solvent, for instance by filtration. Thereafter, the product so obtained is dried before incorporating in the substances to be dyed. The incorporation of the stabilized dystuffs in the substances to be dyed can be performed by usual blending procedures.

The stabilized dyestuffs obtained by the inventive process are especially suitable for dyeing medicines, for instance for dyeing gelatine capsules for medicinal purposes and for dyeing dragee coats. Gelatine capsules prepared by using the stabilized dyestuffs obtained by the inventive process are characterized by the stability of their color to degradation by light and oxidation.

The invention process can be applied generally to dyestuffs sensitive to light and/or oxidation of natural or synthetic origin for dyeing medicines, cosmetics, food stuff and animal feed especially to physiologically compatible dyestuffs as they are conveniently used for dyeing food.

Some of the preferred dyestuffs are specified in the following table.

| Dyestuff | Synonyms | Col. Index No. (1956) | EEC | max |
|---|---|---|---|---|
| Curcumin | Curcuma Saffron | 75 300 | E 100 | 425 nm |
| Lactoflavine | Riboflavine Vitamine B 2 | — | E 101 | 440 nm |
| Cochineal red | Carminic acid Carmine | 75 470 | E 120 | 520 nm |
| Caramel | Burut sugar Browning | — | E 150 | 334 nm |
| $\beta$-Carotene | — | 75 130 | E 160a | 460 nm |
| Annatto | Orlean, arnotto Bixine Orelline | 75 120 | E 160 | 430 nm |

| Dyestuff | Synonyms | Col. Index No. (1956) | EEC | max |
|---|---|---|---|---|
| Betanidin | (Bixa orellana) Betacyans | — | E 162 | 400 nm 530 nm |
| Oenocyanine | — | — | E 163 | =f(pH) |
| Chlorophyll | Chromule | 75 810 | E 141 | 650 nm |

In order to obtain opaque dyes inorganic pigments, for instance titaniumoxide, can be used.

The following examples illustrate the invention.

EXAMPLE 1

An aqueous solution containing about 2% of curcumin is prepared. To said solution 5% "Aerosil 200" (a silicagel which is highly adsorptive) available from Degussa are added by stirring. Thereby, the curcumin is adsorbed onto the "Aerosil 200". The saturation of the substrate is completed at room temperature after about 60 minutes. The concentration of the adsorbed dyestuff was about 20% with respect to weight of the substrate. The so obtained dyestuff complex was separated by filtration and dried at about 60° C. for 12 hours. A gelatine solution containing about 30% gelatine was dyed with the stabilized dyestuff.

The discoloration of the dyestuff in the gelatine was measured colometrically. The dyestuff stabilized in the described manner showed after 4 hours exposition to light a four times greater stability as the untreated dyestuff.

EXAMPLE 2

In the same manner as in Example 1 oenocyanine was stabilized. The colorimetric measuring of the gelatine solution dyed therewith showed after 4 hours exposition to light a three times greater stability than the untreated oenocyanine.

We claim:

1. A process for stabilizing a natural dyestuff for gelatine capsules against degradation by light or oxidation which comprises
   A. dissolving said dyestuff in a suitable solvent;
   B. contacting the resulting dyestuff solution with a finely divided adsorbent and immobilizing said dyestuff on said adsorbent thereby stabilizing said dyestuff;
   C. separating the resulting stabilized dyestuff from said solution; and
   D. drying said stabilized dyestuff
   and E. adding said stabilized dyestuff into gelatin for capsules.

2. A process according to claim 1 for stabilizing a natural dyestuff for gelatine capsules which comprises
   A. dissolving said dyestuff in a physiologically compatible or readily volatile solvent selected from the group consisting of water, alcohol, diethylether, tetrachloroethylene, and acetone in a concentration from about 0.1% to about 10% by weight of said solvent;
   B. contacting the resulting dyestuff solution with an adsorbent of particle size from about 1 to about 100 millimicrons selected from the group consisting of carbonates, silicates, hydroxides, and oxides of groups II, III, IV of the periodic table of the elements, cellulose, starches, alginates, polyamides, and polyacrylates in an amount from about 1% to about 10% by weight of the solvent at about room temperature and pH of about 3 to about 10.

3. The process according to claim 1 which comprises adding an adsorption promoter selected from the group consisting of alkali metal halide, alkali metal sulfates, alkali metal phosphates, to said dyestuff solution in an amount of from about 1% to about 10% by weight of said adsorbent.

4. The process according to claim 1 or 3 which comprises adding an antioxidant to said dyestuff solution.

5. The process according to claim 4 which comprises adding an antioxidant selected from the group consisting of tocopherol, 6-ethoxy-1,2-dihydro-2,2,4-trimethylquinoline, and ascorbyl palmitate to said dyestuff solution in an amount of from about 0.01% to about 10% by weight of said dyestuff.

6. A stabilized natural dyestuff for gelatine capsules prepared by the process of claim 1.

7. A process for dyeing gelatine capsules using the stabilized natural dyestuff of claim 6.

8. Dyed gelatine capsules prepared by using the stabilized natural dyestuff of claim 6.

* * * * *